United States Patent [19]

Perales

[11] Patent Number: 4,976,142
[45] Date of Patent: Dec. 11, 1990

[54] BOREHOLE PRESSURE AND TEMPERATURE MEASUREMENT SYSTEM

[75] Inventor: Kenneth L. Perales, Rosenberg, Tex.

[73] Assignee: Baroid Technology, Inc., Houston, Tex.

[21] Appl. No.: 422,680

[22] Filed: Oct. 17, 1989

[51] Int. Cl.⁵ .............................. E21B 47/06
[52] U.S. Cl. ....................... 73/155; 374/136
[58] Field of Search ............. 73/151, 154, 155; 166/250; 374/136, 143

[56] References Cited

U.S. PATENT DOCUMENTS

| | | | |
|---|---|---|---|
| 2,547,876 | 4/1951 | Krasnow | 374/136 |
| 2,685,798 | 8/1954 | Goble | 374/136 |
| 3,895,527 | 7/1975 | McArthur | 73/151 |
| 3,898,877 | 8/1975 | McArthur | 73/154 |
| 4,010,642 | 3/1977 | McArthur | 73/151 |
| 4,568,933 | 2/1986 | McCracken et al. | 73/155 |

Primary Examiner—Hezron E. Williams
Assistant Examiner—Kevin D. O'Shea
Attorney, Agent, or Firm—Browning, Bushman, Anderson & Brookhart

[57] ABSTRACT

A system is provided for measuring both the temperature and pressure of fluid in a borehole utilizing a single small diameter tube extending from the surface to the desired downhole test location in a borehole. Downhole fluid pressure is transmitted through the small diameter tube, while a sheathed thermocouple line extending along the flow path of the tube is used for transmitting downhold fluid temperature information to the surface. A continuous surface read-out of both pressure and temperature is thus possible, and the temperature read-out may be used to both monitor downhole fluid temperature and increase the accuracy of the fluid pressure measurement system.

20 Claims, 2 Drawing Sheets 4,976,142

BOREHOLE PRESSURE AND TEMPERATURE MEASUREMENT SYSTEM

BACKGROUND OF THE INVENTION

1. Field of the Invention

The present invention relates to techniques for monitoring temperature and pressure in a remote and hostile environment. More particularly, the present invention is directed to reliably measuring downhole fluid pressure and temperature within a borehole of an oil, gas, or geothermal well.

2. Description of the Background

The accurate measurement of downhole fluid pressure and temperature in a borehole has long been recognized as being important in the production of oil, gas, and/or geothermal energy. Accurate pressure and temperature measurements typically indicate a number of problems in pumping wells which are commonly used in oil recovery operations. Both secondary hydrocarbon recovery operations and geothermal operations typically require pressure and temperature information to determine various factors considered useful in predicting the success of the operation, and in obtaining the maximum recovery of energy from the borehole.

In secondary hydrocarbon recovery operations, accurate borehole pressures specifically give an indication of well productivity potential, and allow the operator to predict the amount of fluid that should be required to fill the formation before oil or gas can be expected to be forced out from the formation into the borehole and then recovered to the surface. In geothermal wells, accurate pressure and temperature information is critical to efficient production due to the potential damage which occurs if reinjected fluids cool the formation. As a further example, the accurate measurement of pressure and temperature changes in well fluids from each of various boreholes extending into a formation may indicate the location of injection fluid fronts, as well as the efficiency with which the fluid front is sweeping the formation.

Techniques have been devised for providing a periodic measurement of downhole conditions by lowering sensors into the borehole at desired times, although such periodic measurement techniques are both inconvenient and expensive due to the time and expense normally required to insert instrumentation into the borehole. Any such periodic measurement technique is limited in that it provides only a representation of borehole conditions at specific times, and does not provide the desired information over a substantial length of time which is typically desired by the operator. An example of this type of system is disclosed in U.S. Pat. No. 3,712,192, which teaches charging an open-ended tube with a gas until it bubbles from the bottom of the tube in order to provide the desired periodic pressure measurement.

Permanent installation techniques have been devised for continually monitoring pressure in a borehole in a manner which overcomes the inherent problems associated with periodic measurement. One such prior art technique employs a downhole pressure transducer and a temperature sensor having electronic scanning ability for converting detected downhole pressures and temperatures into electronic data, which then are transmitted to the surface on a conductor line. The conductor line is normally attached to the outside of the tubing in the wellbore, and the transducer and temperature sensor are conveniently mounted on the lower end of the production tubing. This system has not, however, been widely accepted in the industry, in part because of the expense and high maintenance required for the electronics positioned in the hostile wellbore environment over an extended period of time. The high temperatures, pressures and/or corrosive fluids in the wellbore thus substantially increase the expense and decrease the reliability of the downhole electronics. Downhole pressure transducers and temperature sensors which output electronic data for transmission to the surface are generally considered delicate systems, and thus are not favored in the hostile environments which normally accompany a downhole wellbore.

U.S. Pat. No. 3,895,527 discloses a system for remotely measuring pressure in a borehole which utilizes a small diameter tube which has one end exposed to borehole pressure and has it other end connected to a pressure gauge or other detector at the surface. The concept of measuring downhole pressure according to a system which uses such a small diameter tube is also disclosed in U.S. Pat. No. 3,898,877, and an improved version of such a system is disclosed in U.S. Pat. No. 4,010,642. The teachings of this latter patent have rendered this technology particularly well suited for more reliably measuring pressure in a borehole, since the lower end of the tube extends into a chamber having at least a desired volume which satisfies the relationships expressed in the '642 patent.

Although the techniques disclosed in the '642 patent have been accepted in the energy recovery industry, the teachings of this patent do not enable the detection of both downhole temperature and pressure at the desired location within the borehole. In general, an operator may estimate downhole fluid temperature by either extrapolating from assumed temperature gradient data and temperature measurements taken at the surface, and/or by estimating an average temperature for the borehole from previously obtained drilling data. This estimated temperature may then be used to determine a test fluid correction factor, which may then applied to more accurately determined downhole pressure. Those skilled in the art have long recognized, however, that accurate temperature information is not being obtained, and that the correction of pressure readings based on such inaccurate temperature estimates accordingly results in errors in the pressure readings obtained by the technique of utilizing such a small diameter tube.

The disadvantages of the prior art are overcome by the present invention, and improved methods and apparatus are hereinafter disclosed for reliably detecting both pressure and temperature in a wellbore utilizing a single small diameter tubing extending from the surface of the well to the desired downhole test location.

SUMMARY OF THE INVENTION

The pressure and temperature measurement system of the present invention is particularly well suited for use in oil, gas and geothermal wells. A small diameter tube extends from the surface to the desired downhole test location, and houses a sheathed thermocouple line which similarly extends from the surface to the downhole location for accurately relating downhole temperature measurements. A housing is lowered in the well to the test location, and includes a chamber which is open to both downhole fluids and the flow path in the tube. The tube and a portion of the chamber are filled with a selected fluid, and borehole fluid pressure fluctuations are thereby transmitted to the surface via the fluid in the annular space between the interior diameter of the tubing and the thermocouple line. Borehole temperature measurements are taken at the surface by monitoring the electromotive force across the thermocouple, which is transmitted via the line to the surface for readout. Both pressure and temperature monitoring and plotting devices may be provided at the surface, and the temperature sensing instrumentation is preferably used to determine a more accurate downhole pressure reading.

It is object of the present invention to continuously provide reliable downhole temperature and pressure information to the surface of a well utilizing a single tube extending from the surface to the downhole test location and a thermocouple line within the interior of the tube.

It is a further object of the invention that the thermocouple line extending from the surface to the downhole test location be protected in part by the test fluid in the tube, which test fluid is less hostile than the fluids otherwise in the wellbore.

It is a feature of the invention that both downhole fluid temperature and pressure may be continuously monitored without utilizing any electrojunctions within in either the borehole or the wellhead.

It is an advantage of the invention that multiple lines need not extend from the surface to the downhole test location in order to reliably monitor both fluctuating well fluid pressure and temperature.

These and further objects, features, and advantages of the present invention will become apparent from the following detailed description, wherein references made to the figures in the accompanying drawings.

BRIEF DESCRIPTIONS OF THE DRAWINGS

DETAILED DESCRIPTION OF PREFERRED EMBODIMENTS

The present invention has utility for reliably monitoring downhole fluid pressure and temperature in a oil, gas or geothermal well. For purposes of the present invention, the downhole fluid to be monitored is presumed to be at a depth in the well of at least 1,000 feet, and typically would be several thousand feet or more below the surface. The fluctuating downhole fluid pressure to be monitored is typically less than normal hydrostatic pressure, although this downhole fluid pressure may be monitored in flowing, pumping or static wells, and the downhole fluid may be equal or greater than hydrostatic pressure.

Figure 1:
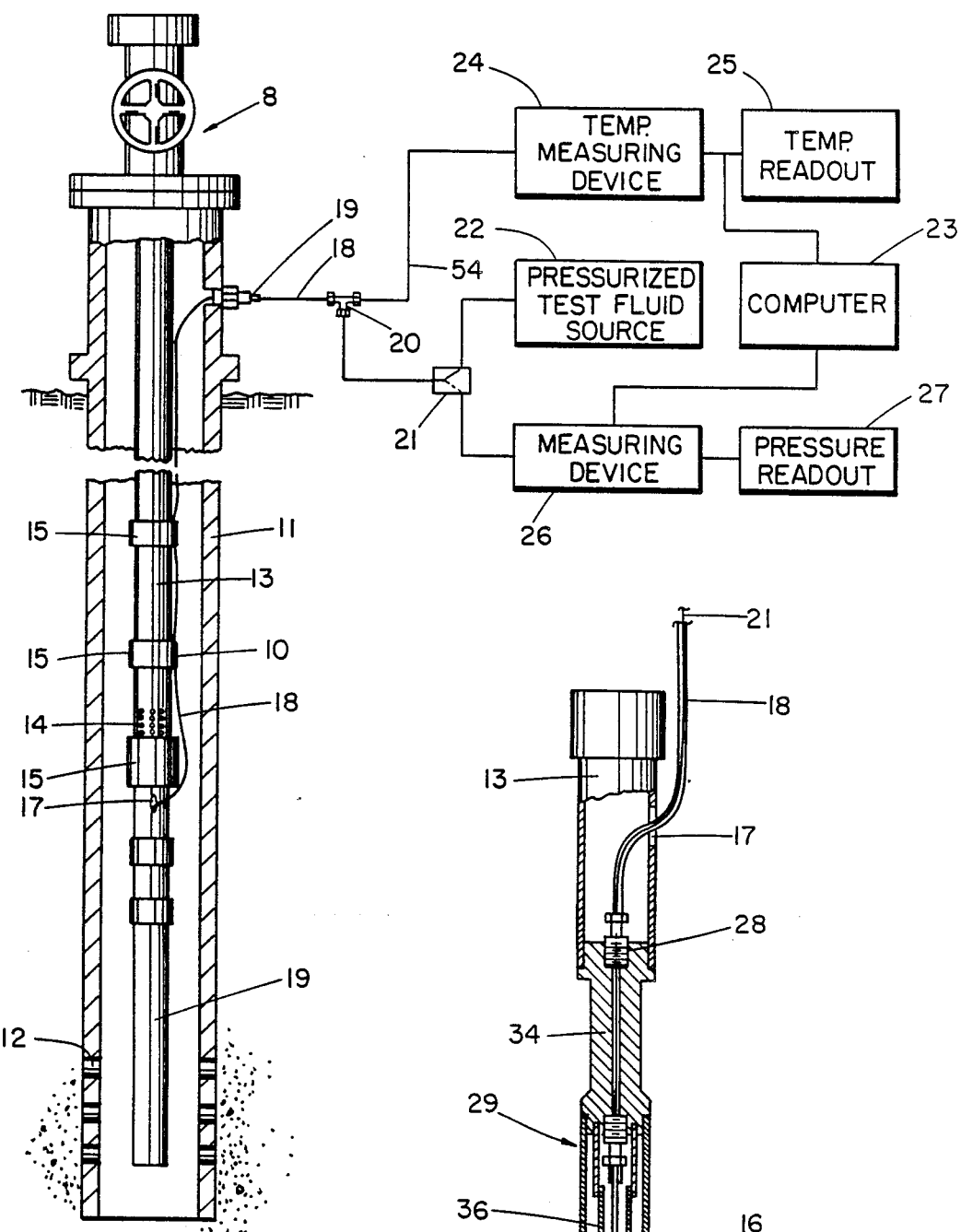
FIG. 1 is a pictorial view, partially in cross-section, of the pressure and temperature monitoring system according to the present invention in a wellbore of a producing hydrocarbon recovery well.

FIG. 1 illustrates a typical wellbore extending into underground formation. FIG. 1 illustrates a producing well, and thus production equipment including a conventional wellhead 8 is shown generally at the surface. A casing 11 is positioned in the wellbore, and has perforations 12 at its lower end to permit the entry of fluid from the formation into the casing 11. Production tubing string 13 extends from the wellhead at the surface to a selected depth in the borehole. A perforated portion 14 of the tubing string 13 allows fluid in the casing 11 to enter the production tubing and then to flow to the surface. Collar protectors 15 are provided along the tubing string 13 to secure a small diameter continuous tubing 18 to the tubing string 13 and thus assist in protecting the small diameter tubing in the borehole. A housing 19 is provided at the lower end of the production tubing 13, and includes a chamber 16 having ports for maintaining fluid communication between the chamber and the fluid in the wellbore outside the housing 19.

The small diameter tube 18 in accordance with the present invention extends from the surface to the test location where housing 19 is located. The tubing 18 may enter a lower portion of the production tubing 13 at entry port 17, then continue downward into the housing 19 so that the lower end of the tubing 18 is in fluid communication with the chamber 16. Suitable small diameter tubing according to the present invention may have an 0.250" outer diameter and an 0.18" internal diameter. A thermocouple line is provided within the tube, and this thermocouple line would typically have a cross-sectional area from about 25% to about 50% of the cross-sectional area of the flow path in the tube. As those skilled in the art appreciate, small diameter tubing in the range as specified above is commonly referred to as microtubing.

FIG. 1 also indicates that the tube 18 extends to the surface of the well and exits on the side of the well at fitting 10. Manifold 20 provided for sealing around the tube and allowing the thermocouple line to exit the manifold and continue to temperature measuring equipment 24, with its output fed to temperature readout 25. The manifold has a fluid exit port that effectively provides for a continuation of the tube to a valve 21, which in turn may be connected by one line to a pressurized fluid source 22, and by another line to a pressure measuring device 26, with its output fed to pressure readout 27). It should be understood that the temperature measurement and readout devices may be provided separate from or as part of the pressure measuring device 26 and readout 27. In either event, however, the output from the temperature measuring device 24 is preferably input to computer 23, which then transmits a pressure correction signal to device 26, as explained subsequently.

Figure 1A:
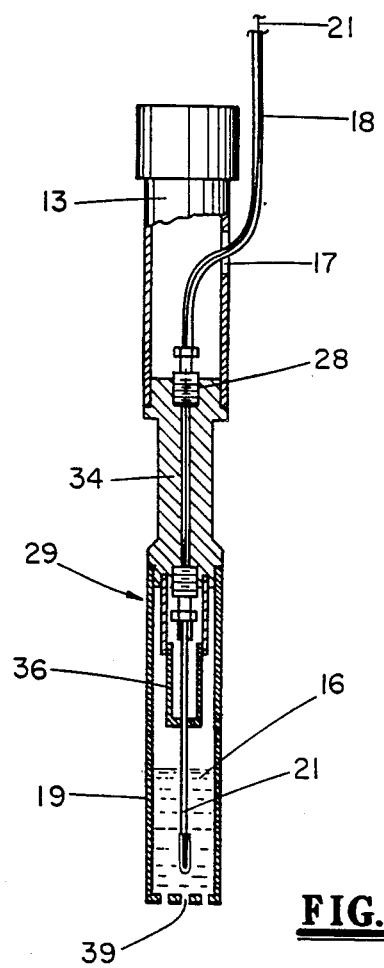
FIG. 1A is a simplified pictorial view, partially in cross-section, of a portion of the pressure and temperature monitoring system shown in FIG. 1.

Referring now to FIG. 1A, the lower end of the housing 19 has entry ports 30 which establish fluid communication between the chamber 16 and wellbore, while the upper end of the chamber 16 is in fluid communication with the tubing 18. Thermocouple 21 extends from the end of the tubing 18 into the chamber 16, and is preferably positioned in the chamber at a location below the test fluid and thus in contact with the borehole fluid. A filter assembly 36 may be fabricated from a porous metal material or small mesh screen and prevent solids from communicating between the chamber 16 of the tube 18. Tubing 18 may be physically connected to a top plug fitting 34 by assembly 28, which also provides a fluid-tight seal between the tubing 18 and the fitting 34. A second or backup assembly 29 similarly provides a connection between the lower end of the fitting 34 and the tubing 18. Tubing 18 may terminate immediately below the assembly 29, although the thermocouple line 21 preferably extends downward into engagement with the well fluid so that the thermocouple junction 38 is directly in the downhole fluid and thus responsive to its fluctuating temperature. The system as shown in FIGS. 1 and 1A may therefore be characterized as a semipermanent measurement system, since the downhole components and the tubing 18 would remain connected to the production tubing 13 until the production tubing was returned to the surface.

Figure 2:
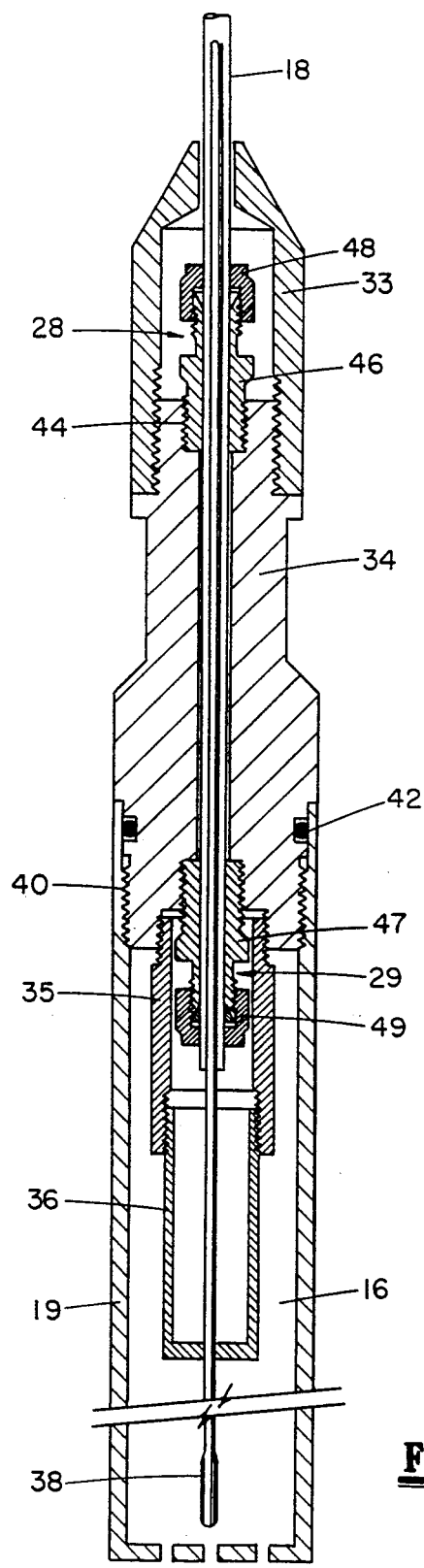
FIG. 2 is a detailed cross-sectional view of a suitable downhole portion of the pressure and temperature monitoring system suspended in a wellbore from a small diameter tubing.

FIG. 2 depicts an alternate embodiment of the lower portion of the pressure and temperature monitoring system, which may be lowered into a wellbore from the small diameter continuous tubing 18 rather than from production tubing. In this embodiment, the downhole equipment thus consists of a top shroud 33 for receiving the small diameter tubing 18. Shroud 33 has lower threads for engagement with top plug fitting 34, which has cylindrical interior passageway for receiving the tubing 18. Fitting 34 is threadably connected to housing 19 by threads 40, and sealed engagement between these bodies is provided by a suitable o'ring seal 42.

FIG. 2 depicts in detail assembly 28 for mechanically connecting tubing 18 and fitting 34. Member 46 may be threaded at 44 to fitting 34, and includes a cylindrical interior passageway aligned with the passageway in the fitting 34. A top cap 48 may be threaded to member 46, and torqued rotation of 48 relative to 46 causes the interior cylindrical surface of ferrule 45 to sealing grasp the tubing 18 in a conventional manner. A similar member 47 is shown for the second or backup assembly 29, and includes a corresponding cap 49 for threaded engagement with 47 and thus similarly grasp the tubing 18. The shroud 33 physically protects the upper assembly 28, and a sleeve-like extension 35 may be threaded to the top plug fitting 34 and similarly form a protective housing for the lower assembly 29. A filter assembly 36 as described above may be threadably connected to the lower end of sleeve 35, and keeps solid debris in the well fluids from entering the interior of tubing 18. The thermocouple line 21 extends downward past the filter 36, so that the thermocouple measuring junction 38 is in fluid communication with the downhole well fluids.

The apparatus as shown in FIG. 2 is accordingly adapted for being suspended in the wellbore solely from the tubing 18. Accordingly, this embodiment is particularly well suited for measuring downhole tubing temperature and pressure in geothermal wells where no production tubing is typically utilized. Those skilled in the art will appreciate, however, that the upper portion of the apparatus as shown in FIG. 2 may be easily altered so that the downhole assembly can be secured from the lower end of production tubing, as generally shown in FIG. 1A, in which case the small diameter tubing 18 could then pass into interior of the production string at a suitable port 17 provided therein.

According to the present invention, the volume of the chamber 16 must be sufficiently large to accommodate the minimum and maximum pressure anticipated in the wellbore. The required volume of this chamber is based in part on the volume of the flow path in the tube, and thus takes into consideration the interior cross-sectional area of the tubing 18, the length of the tubing 18, and the cross-sectional area of the thermocouple line 21.

The downhole chamber 16 thus has at least preselected volume as set forth in U.S. Pat. No. 4,010,642. This minimum chamber volume is based on the volume of test fluid in the tube, the chamber volume may be significantly reduced by the inclusion of the thermocouple line within the tube. Accordingly, the minimum chamber volume according to the present invention is based on the cross-sectional area of the annulus between the internal diameter of the tube and the external diameter of the thermocouple in the tube, rather than the interior cross-sectional area of the tube itself. Further details with respect to the minimal volume of the chamber 16 are disclosed in the U.S. Pat. No. 4,010,642, which is hereby incorporated by reference.

In operation, the small diameter tubing 18 with the thermocouple line positioned therein is secured to the housing 19, as illustrated in FIG. 1A or FIG. 2. The housing 19 and tubing 18 are then lowered to the desired test location in the wellbore, and valve 21 is manipulated so that the tubing 18 is filled with a desired test fluid from source 22 at the surface. Once the desired test fluid/downhole fluid interface within the chamber 16 is obtained, valve 21 may be manipulated to shutoff the test fluid source 22 while simultaneously allowing the pressure measuring device 26 to be responsive to test fluid pressure at the surface in the tubing 18. Fluid temperature and pressure may be maintained continuously with the downhole apparatus remaining at the same depth for the semipermanent installation equipment as shown in FIG. 1 and 1A, or may be monitored at various selected depths over a period of time during which the downhole equipment as shown in FIG. 2 is raised or lowered through the borehole.

Various types of test fluids may be used for filling the interior of the tube 18 and a portion of the chamber 16, provided the thermal compressability characteristics of the fluid are known. Both nitrogen and helium have been found particularly suitable as a test fluid, in part because the compressability factor, sometimes referred to as the "Z factor", for each of these fluids is well known in the range of commonly encountered downhole fluid pressures and temperatures.

Those skilled in the art will now appreciate that the temperature of the well fluid at the desired test location in the borehole can be easily and reliably monitored by surface equipment which measures the electromotive force created by the thermocouple junction. The thermocouple line thus transmits this indication of temperature from the thermocouple junction 38 in contact with the well fluid to the measuring device 24 at the surface. If desired, these temperature readings can be conveniently output at 25 and maintained on any number of suitable recording means, such as a chart recorder.

The temperature readings as obtained above can also be used to more reliably determine the accurate downhole fluid pressure. Those skilled in the art appreciate that the actual downhole fluid pressure is a function of the pressure measured at the surface and the hydrostatic pressure of the test fluid passing from the surface to the downhole test location. The hydrostatic head of a test fluid, in turn, is a function of the vertical depth from the surface to the downhole test location, and the gas gradiant of the test fluid. The true verticle depth for determining the hydrostatic pressure of the test fluid is generally known or can be easily determined by conventional methods. The gas gradiant for the test fluid can be determined by the following formula:

$$\frac{\text{Gas}}{\text{Gradiant}} = \frac{(\text{Specific Gravity}) \times (\text{Approx. Average Pressure})}{(Z \text{ Factor}) \times (\text{Average Temperature})}$$

The above formula thus requires the average temperature of the test fluid be known, and the techniques of the present invention can be easily used to monitor the downhole temperature of the test fluid and thereby more accurately determine the average temperature of the test fluid and thus determine the correct gas gradiant. The specific gravity of the test fluid, as well as the Z factor, can be determined with sufficient accuracy from the uncorrected or approximate test fluid pressure readings and the test fluid temperature readings. Since the addition of the thermocouple within the small diameter tubing allows for accurate temperature measurements of the downhole fluid and thus more accurate average test fluid temperature determinations, significantly more accurate and yet continuous pressure measurements of the well fluid may thus be determined in real time in accordance with the present invention.

Figure 3:
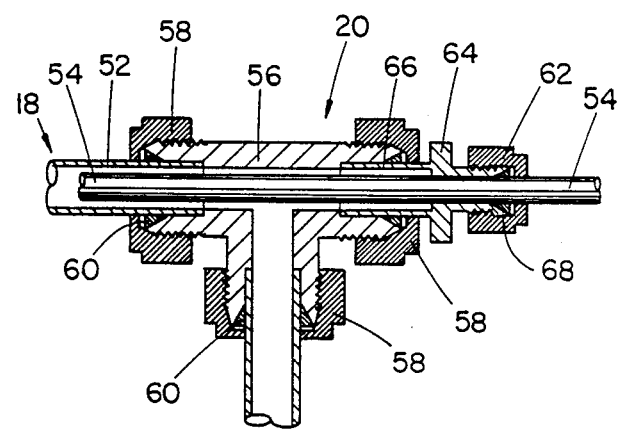
FIG. 3 is a detailed cross-sectional view of suitable surface manifold for separating the pressurized test fluid and the thermocouple line so that both pressure and temperature can be monitored by suitable surface equipment.

FIG. 3 depicts a suitable manifold conveniently located at the surface apart from the wellhead for separating the thermocouple line and the pressurized test fluid. The T-shaped body is provided with an input port for receiving the tubing 18 and the thermocouple line interior thereof, an output port in fluid communication with the tubing for passing pressure readings to measuring device 26, and an output port for transmitting the thermocouple line to the temperature measuring device 24 while sealing the test fluid within the body 56.

Three identical end caps 58 may be provided at each of the ports. End cap 58 may be threaded to the body 56 at the input port to force ferrule 60 into gripping and sealed engagement with the outer cylindrical surface 52 of the tubing 18. Similarly, the end cap 58 may be provided at the pressure output port of the manifold 20 for enabling the test fluid be transmitted outside of the manifold 20 and to the measuring device 26. Fitting 64 having a sleeve-shaped portion 66 structurally similar to tube 18 may be connected to the body 56 by end cap 58. The end of fitting 64 outside the body 56 has a cylindrical passageway closely approximating the outer diameter of the thermocouple line 54, which extends to the temperature measuring device 24. Line 54 may be sealed to the fitting 64 by another end cap 62 and ferrule 68. While the design and construction of the manifold 20 are not critical to the present invention, it is a significant feature of the present invention that the manifold can be located at the surface at a location separate from the wellhead 8.

The small diameter tube 18 according to the present invention preferably has an internal diameter of less than approximately 0.21 inches. In order to accommodate the thermocouple line, this interior diameter should be greater than about 0.10 inches. The effective volume of the tube, and thus its cross-sectional area, should follow the guidelines set forth in U.S. Pat. No. 4,010,642. The thermocouple line includes two dissimilar metal conductors, which have high reliability due to the combination of the protection afforded by the non-hostile environment created by the test fluid in the tube 18 which surrounds the thermocouple line, and the physical protection afforded by the structure shown in FIG. 4. This physical structure may be relatively inexpensive compared to thermocouple lines which would otherwise extend into a borehole, due to the non-hostile environment in which this thermocouple line is placed in accordance with the present invention. The two dissimilar metal conductors are joined to form a thermocouple junction which is located within the chamber in the housing 19 to measure downhole fluid temperature, either by being in engagement with that fluid, or by being positioned in the test fluid immediately above the downhole fluid. The latter situation will thus result in a slower responsive time to defect fluctuating downhole fluid temperature.

Figure 4:
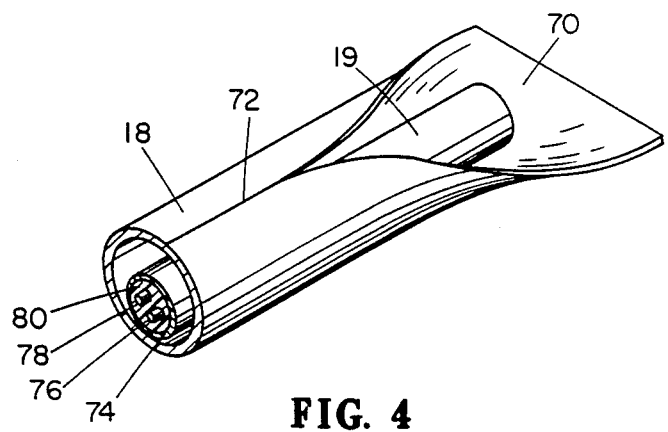
FIG. 4 is simplified pictorial view of a suitable technique for installing a thermocouple line in a test tube in accordance with the present invention.

Since the downhole fluid to be measured by the present invention may be a 1,000 feet or more below the surface, it would be difficult if not impossible to insert the thermocouple into the small diameter tubing after the tubing was manufactured. While such insertion might be possible for a larger diameter tubing, the small diameter of the tubing 18 and its associated low cost and low volume are significant features of the invention. Accordingly, the thermocouple line 19 is preferably inserted into the tubing 18 as the tubing is fabricated. FIG. 4 depicts a flat sheet metal stock 17 used to form the tubing, which may be bent by suitable extrusion dies (not depicted) to form a tubular member. The tubing is then completed by sealing the adjacent end surfaces by a continuous weld 72. The thermocouple line 19 is preferably placed against the sheet metal 70 and held away from the weld 72 during this welding process, so that the tubing 18 is effectively formed about the thermocouple line, and so that the heat from the weld 17 does not damage the line 19. FIG. 4 depicts thermocouple 19 comprising a relatively low cost outer stainless steel sheath 74, and conductor wires 76 and 78 positioned within the sheath and electrically isolated from both each other and the sheath by insulating material 80. Various thermocouple lines and thermocouple junctions may be used in accordance with the present invention, although a suitable thermocouple line manufactured with a magnesium oxide insulating material, and utilizes an ungrounded measuring junction electrically isolated from the sheath end, which both protects the junction and minimizes stray electromotive force signals.

One of the advantages of the present invention is that both temperature and pressure readings of the downhole fluid can be easily obtained at the surface, although only one line need be installed in the wellbore. The utilization of one rather than two lines substantially increases the reliability of the system according to the present invention, since twisting problems normally associated with long lengths of two or more lines as they are lowered into the borehole are avoided. The questionable reliability of a system using multiple lines, as well as the delays and costs associated with repairing those systems, are thus avoided by the present invention since a single line is provided for reliably measuring both pressure and temperature.

It is a further advantage of the present invention that the thermocouple line is substantially protected by the inert test fluid in the small diameter tubing. Although the thermocouple is preferably sheathed in metal over its entire length so that no wires are exposed to the test fluid, thermocouple line itself is not exposed to the hostile and generally corrosive borehole environment. Test fluid is sealed at a location of the manifold which is outside of the wellhead, so that an electrical junction is not necessary either in the wellhead or in the borehole. Since the thermocouple line is substantially protected by the selected test fluid, the metal sheathing of the thermocouple line may be fabricated from stainless steel or other material which is substantially less expensive than exotic materials which are necessary for protecting the thermocouple wires from the corrosive and hostile borehole fluids.

While particular embodiments of the present invention have been shown and described, it is apparent that further changes and modifications can be made without departing from the spirit and scope of the invention. It is therefore the intention that the following claims cover all such changes and modifications.

What is claimed is:

1. Apparatus for continuously measuring fluctuating pressure and temperature of a downhole fluid in a borehole at a desired depth, the apparatus comprising:
   a tube positioned within the borehole and having a flow path extending continuously from the surface to the desired depth;
   a housing suspended in the borehole at the desired depth from the tube, the housing defining a chamber in fluid communication with both the downhole fluid and the flow path in the tube;
   a pressurized test fluid source at the surface for initially pressuring the flow path in the tube and a portion of the chamber in the housing with a selected fluid to form an interface of the selected fluid and the downhole fluid within the chamber:
   a valve for selectively isolating fluid communication between the tube and the pressurized test fluid source;
   a thermocouple line including two dissimilar metal conductors positioned within the flow path of the tube and extending from the surface to the housing in the borehole;
   the two dissimilar metal conductors joined to form a thermocouple junction positioned within the chamber in the housing:
   a manifold at the surface for sealing the selected fluid within the flow path, the manifold having an input port sealingly receiving the tube and thermocouple line, a thermocouple exit port for directing the thermocouple line from the manifold while sealing the selected fluid within the manifold, and a fluid exit port for directing the pressurized selected fluid from the manifold;
   a pressure measuring device at the surface and in fluid communication with the fluid exit port of the manifold for measuring fluid pressure of the selected fluid to determine downhole fluid pressure at the desired depth; and
   a temperature measuring device at the surface for receiving the thermocouple line extending from the manifold and measuring the temperature of the downhole fluid at the desired depth.

2. Apparatus as defined in claim 1, further comprising:
   first and second axially spaced connectors each physically in fluid-tight engagement with the tube for interconnecting the tube and the housing.

3. Apparatus as defined in claim 1, further comprising:
   computing means at the surface for receiving a temperature signal from the temperature measuring device and outputting a correction signal to the determined fluid pressure as a function of the measured temperature of the downhole fluid.

4. Apparatus as defined in claim 1, wherein the thermocouple junction is positioned within the chamber and in engagement with the downhole fluid.

5. Apparatus as defined in claim 1, wherein the selected fluid is selected from a group consisting of nitrogen and helium.

6. Apparatus as defined in claim 1, further comprising:
   a filter positioned within the housing for preventing solids in the downhole fluid from passing into the tube, the filter having a passageway therein for receiving the thermocouple line and an exit port for passing the thermocouple line outside the filter.

7. Apparatus as defined in claim 1, further comprising:
   a temperature readout device for outputting an indication of downhole fluid temperature in response to the temperature measuring device.

8. Apparatus for monitoring fluctuating pressure and temperature of a downhole fluid in a borehole at a desired depth, the apparatus comprising:
   a tube positioned within the borehole and having a flow path extending continuously from the surface to the desired depth in the borehole;
   a housing suspended in the borehole and defining a chamber in fluid communication with both the downhole fluid and the flow path in the tube;
   a pressurized test fluid source at the surface for initially pressuring the flow path in the tube and a portion of the chamber in the housing with a selected fluid to form an interface of the selected fluid and the downhole fluid within the chamber;
   a thermocouple line positioned within the flow path of the tube and extending from the surface to the housing in the borehole;
   a thermocouple junction positioned within the chamber in the housing;
   a manifold at the surface for sealing the selected fluid within the flow path, the manifold having an input port sealingly receiving the tube and thermocouple line, a thermocouple exit port for directing the thermocouple line from the manifold while sealing the selected fluid within the manifold, and having a fluid exit port for directing the pressurized selected fluid from the manifold;
   a pressure monitoring device at the surface and in fluid communication with the fluid exit port of the manifold for monitoring fluid pressure of the selected fluid to determine downhole fluid pressure at the desired depth; and
   a temperature monitoring device at the surface for receiving the thermocouple line extending from the manifold and monitoring the temperature of the downhole fluid at the desired depth.

9. Apparatus as defined in claim 8, wherein the housing is suspended in the borehole from a production tubing extending from the surface to the desired depth and having a flow path therein for transmitting fluids between the surface and the borehole.

10. Apparatus as defined in claim 8, further comprising:
    computing means at the surface for receiving a temperature signal from the temperature monitoring device and outputting a correction signal to the determined fluid pressure as a function of the monitored temperature of the downhole fluid.

11. Apparatus as defined in claim 10, further comprising:

a pressure readout device for outputting an indication of downhole fluid pressure in response to the pressure monitoring device and the correction signal from the computing means.

12. Apparatus as defined in claim 8, wherein the thermocouple junction is positioned within the chamber and in engagement with the downhole fluid.

13. Apparatus as defined in claim 8, wherein the selected fluid is selected from a group consisting of nitrogen and helium.

14. A method of monitoring fluctuating pressure and temperature of a downhole fluid in a borehole at a desired depth, a method comprising:

lowering a tube having a thermocouple line therein into the borehole, the tube having a flow path extending continuously from the surface to the desired depth, and the thermocouple line extending from the surface to the desired depth;

lowering a housing to the desired depth in the borehole, the housing defining a chamber in fluid communication with both the downhole fluid in the borehole and the flow path in the tube;

positioning a thermocouple junction formed at a lowermost end of the thermocouple line within the chamber of the housing;

pressurizing the flow path in the tube and a portion of the chamber in the housing with a selected fluid to form an interface of the selected fluid and the downhole fluid within the chamber in the housing;

at the surface, sealing the selected fluid within the flow path while outputting the thermocouple line from the tube;

monitoring pressure of the selected fluid in the tube at the surface to determine fluid pressure of the downhole fluid at the desired depth; and monitoring electromotive force in the thermocouple line at the surface to determine the temperature of the downhole fluid at the desired depth.

15. The method as defined in claim 14, further comprising:

suspending the housing at the desired depth in the borehole from production tubing extending from the surface to the desired depth;

positioning the tube exterior of the production tubing; and forming a port through the production tubing for passing the tube from the exterior of the production tubing to the chamber in the housing.

16. The method as defined in claim 14, further comprising:

suspending the housing from the tube; and simultaneously lowering the tube and the housing to the desired depth in the borehole.

17. The method as defined in claim 16, wherein downhole fluid pressure is monitored at various selected depths in the borehole as the tubing and suspended housing are lowered within the borehole.

18. The method as defined in claim 16, further comprising:

selecting a tube having a uniform material strength and uniform cross-sectional area as a function of the weight of the tube extending to the desired depth and the weight of the housing.

19. The method as defined in claim 14, further comprising:

computing the fluid pressure of the downhole fluid as a function of the determined temperature of the downhole fluid.

20. The method as defined in claim 14, further comprising:

positioning the thermocouple junction within the chamber in the housing and below the interface, such that the thermocouple junction is in contact with the downhole fluid.

* * * * *

UNITED STATES PATENT AND TRADEMARK OFFICE
CERTIFICATE OF CORRECTION

PATENT NO. : 4,976,142
DATED : December 11, 1990
INVENTOR(S) : Kenneth L. Perales It is certified that error appears in the above-identified patent and that said Letters Patent is hereby corrected as shown below:

Fig. 1, change reference numeral "19" to -- 10 --.

Fig. 1, eliminate reference numeral and lead line associated with reference numeral 10.

Fig. 1A, the reference numeral 29 should extend to the backup assembly.

Fig. 1A, reference numeral "39" should be -- 30 --.

Fig. 2, reference numeral 45 and a lead line should be added for the ferrule 45 within the top cap 48.

Fig. 2, reference numeral 21 and a lead line should be added for the thermocouple line 21.

Signed and Sealed this

Nineteenth Day of May, 1992

*Attest:*

DOUGLAS B. COMER

*Attesting Officer*     *Acting Commissioner of Patents and Trademarks*